(12) United States Patent
Vudathu et al.

(10) Patent No.: US 11,734,694 B2
(45) Date of Patent: Aug. 22, 2023

(54) SYSTEMS AND METHODS FOR DIGITAL REFUNDS

(71) Applicant: JPMORGAN CHASE BANK, N.A., New York, NY (US)

(72) Inventors: Raghuram Vudathu, Downingtown, PA (US); Saumya Agrawal, Mumbai (IN); Himateja Mikkilineni, Middletown, DE (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 118 days.

(21) Appl. No.: 17/118,174

(22) Filed: Dec. 10, 2020

(65) Prior Publication Data

US 2021/0233077 A1   Jul. 29, 2021

(30) Foreign Application Priority Data

Dec. 23, 2019 (IN) .............................. 201911053540

(51) Int. Cl.
   *G06Q 20/40* (2012.01)
   *G06F 9/54* (2006.01)
   *G06Q 30/016* (2023.01)
   *G06Q 20/24* (2012.01)

(52) U.S. Cl.
   CPC .............. *G06Q 20/407* (2013.01); *G06F 9/54* (2013.01); *G06Q 20/24* (2013.01); *G06Q 30/016* (2013.01)

(58) Field of Classification Search
   CPC .... G06Q 20/407; G06Q 20/24; G06Q 30/016; G06F 9/54

USPC ......................................................... 705/44
   See application file for complete search history.

(56) References Cited

U.S. PATENT DOCUMENTS

| 7,428,988 | B1* | 9/2008 | Starr ...................... G06Q 30/06 235/383 |
| 10,664,819 | B1* | 5/2020 | Zafar ................... G06Q 20/322 |
| 2004/0143502 | A1* | 7/2004 | McClung ........... G06Q 30/0212 705/14.1 |
| 2005/0240525 | A1* | 10/2005 | Bagayatkar .......... G06Q 20/102 705/40 |

(Continued)

OTHER PUBLICATIONS

"Consumer willingness to claim a price-matching refund: A look into the process," by Monika Kukar-Kinney; and Dhruv Grewal. Journal of Business Research 59. 2006. pp. 11-18. (Year: 2006).*

*Primary Examiner* — Sara C Hamilton
(74) *Attorney, Agent, or Firm* — Greenberg Traurig LLP

(57) ABSTRACT

Systems and methods for digital refunds are disclosed. According to one embodiment, in an information processing apparatus comprising at least one computer processor, a method for digital refunds may include: (1) receiving, from an issuing financial institution, electronic transaction data for a transaction involving a product purchased by a customer from a merchant, the product having a purchase price; (2) determining a return period in which the product may be eligible for a return to the merchant; and (3) during the return period: (a) retrieving a current price for the product from the merchant or a third-party merchant; (b) determining that the current price for the product may be less than the purchase price; and (c) initiating a refund to the customer from the merchant for a difference between the current price and the purchase price.

4 Claims, 2 Drawing Sheets

(56) References Cited

U.S. PATENT DOCUMENTS

2016/0104188 A1\* 4/2016 Glyman ............. G06Q 30/0234
            705/14.34
2018/0150869 A1\* 5/2018 Finnegan ........... G06Q 30/0239
2018/0225673 A1\* 8/2018 Dubey ................. G06Q 10/10
2019/0236605 A1\* 8/2019 Mchale ............... G06Q 20/407

\* cited by examiner

SYSTEMS AND METHODS FOR DIGITAL REFUNDS

RELATED APPLICATIONS

This application claims priority to, and the benefit of, Indian Patent Application No. 201911053540, filed Dec. 23, 2019, the disclosure of which is hereby incorporated, by reference, in its entirety.

BACKGROUND OF THE INVENTION

1. Field of the Invention

Embodiments generally relate to systems and methods for digital refunds.

2. Description of the Related Art

After a customer makes a purchase for an item from a first merchant, a customer may see the same item offered by a second merchant for a lower price. Currently, if the customer wants the lower price, the customer can either return the item to the first merchant for a refund and purchase the item from the second merchant at the lower price, or the customer can request that the first merchant match the lower price. Either option requires considerable effort by the customer, and in the case of the first option, results in waste and inefficiencies.

SUMMARY OF THE INVENTION

Systems and methods for digital refunds are disclosed. According to one embodiment, in an information processing apparatus comprising at least one computer processor, a method for digital refunds may include: (1) receiving, from an issuing financial institution, electronic transaction data for a transaction involving a product purchased by a customer from a merchant, the product having a purchase price; (2) determining a return period in which the product may be eligible for a return to the merchant; and (3) during the return period: (a) retrieving a current price for the product from the merchant or a third-party merchant; (b) determining that the current price for the product may be less than the purchase price; and (c) initiating a refund to the customer from the merchant for a difference between the current price and the purchase price.

In one embodiment, the step of determining a return period in which the product may be eligible for a return to the merchant may include retrieving a merchant return policy for the product. The merchant return policy may be retrieved from a third-party aggregator using an application programmable interface (API).

In one embodiment, the step of retrieving a current price for the product from the merchant or a third-party merchant may include retrieving the current price for the product from the merchant or the third-party merchant using an API, retrieving the current price for the product from a third-party aggregator using an API, retrieving the current price for the product from a distributed ledger, wherein the merchant or the third-party merchant are participants in the distributed ledger, and the distributed ledger may include current prices for the product from the merchant or the third-party merchant, etc.

In one embodiment, the refund may be initiated when the difference between the current price and the purchase price meets or exceed a threshold amount. The threshold amount may be based on a dollar amount between the current price and the purchase price or a percent difference between the current price and the purchase price.

In one embodiment, the method may further include: receiving, from a customer electronic device, a receipt for the product; extracting a product identifier and the purchase price from the receipt; and matching the extracted product identifier and purchase price to the product and purchase price in the electronic transaction data.

In one embodiment, the method may further include saving a completed refund to a database.

According to another embodiment, in an information processing apparatus comprising at least one computer processor, a method for digital refunds may include: (1) receiving, from a customer electronic device, a receipt for a transaction involving a product purchased by a customer from a merchant; (2) extracting a product identifier and a purchase price from the receipt; (3) determining a return period in which the product may be eligible for a return to the merchant; and (4) during the return period: (a) retrieving a current price for the product from the merchant or a third-party merchant; (b) determining that the current price for the product may be less than the purchase price; and (c) initiating a refund to the customer from the merchant for a difference between the current price and the purchase price.

In one embodiment, the step of determining a return period in which the product may be eligible for a return to the merchant may include retrieving a merchant return policy for the product. The merchant return policy may be retrieved from a third-party aggregator using an application programmable interface (API).

In one embodiment, the step of retrieving a current price for the product from the merchant or a third-party merchant may include retrieving the current price for the product from the merchant or the third-party merchant using an API, retrieving the current price for the product from a third-party aggregator using an API, retrieving the current price for the product from a distributed ledger, wherein the merchant or the third-party merchant are participants in the distributed ledger, and the distributed ledger may include current prices for the product from the merchant or the third-party merchant, etc.

In one embodiment, the refund may be initiated when the difference between the current price and the purchase price meets or exceed a threshold amount. The threshold amount may be based on a dollar amount between the current price and the purchase price or a percent difference between the current price and the purchase price.

In one embodiment, the method may further include saving a completed refund to a database.

In one embodiment, the refund may be issued as a credit to a financial instrument used to conduct the transaction, using credit points, rewards points, miles, discount offers, or any other suitable promotional means the issuer may deem feasible through various products the issuer has. The refund may be offered as a transaction adjustment on the monthly statement, or may be accumulated over a specific period of time and posted to customer's account (e.g., quarterly, every six months, annually, etc.) depending on the product and the terms and conditions.

BRIEF DESCRIPTION OF THE DRAWINGS

For a more complete understanding of the present invention, the objects and advantages thereof, reference is now made to the following descriptions taken in connection with the accompanying drawings in which.

DETAILED DESCRIPTION OF PREFERRED EMBODIMENTS

Embodiments are directed to systems and methods for digital refunds.

In embodiments, a customer making a purchase from a merchant may upload a purchase receipt for an item to an application or web service. The receipt may be from a digital wallet, an online purchase, or an in-person purchase. The purchase price may be extracted from the transaction data sent by the merchant along with the item details when, for example, the customer uses an issuer specific card. The customer may also request that the merchant send the receipt to, for example, an email address that may be associated with the issuer.

The application or webservice may be associated with the financial institution that issued the payment instrument used to purchase the item.

The application or web service backend may then verify the customer purchase, and may electronically monitor the pricing at the merchant and other merchants that may sell the item. For example, the backend may check online prices, etc.

If the merchant or the other merchants offer the item for a lower price, the backend may identity the price difference and automatically refund the difference to the customer.

In one embodiment, the backend may electronically monitor the price for the item during the return period for the merchant.

In one embodiment, the merchant may be charged a credit refund for the amount of the difference. In one embodiment, the merchant may also be charged a service fee.

Figure 1:
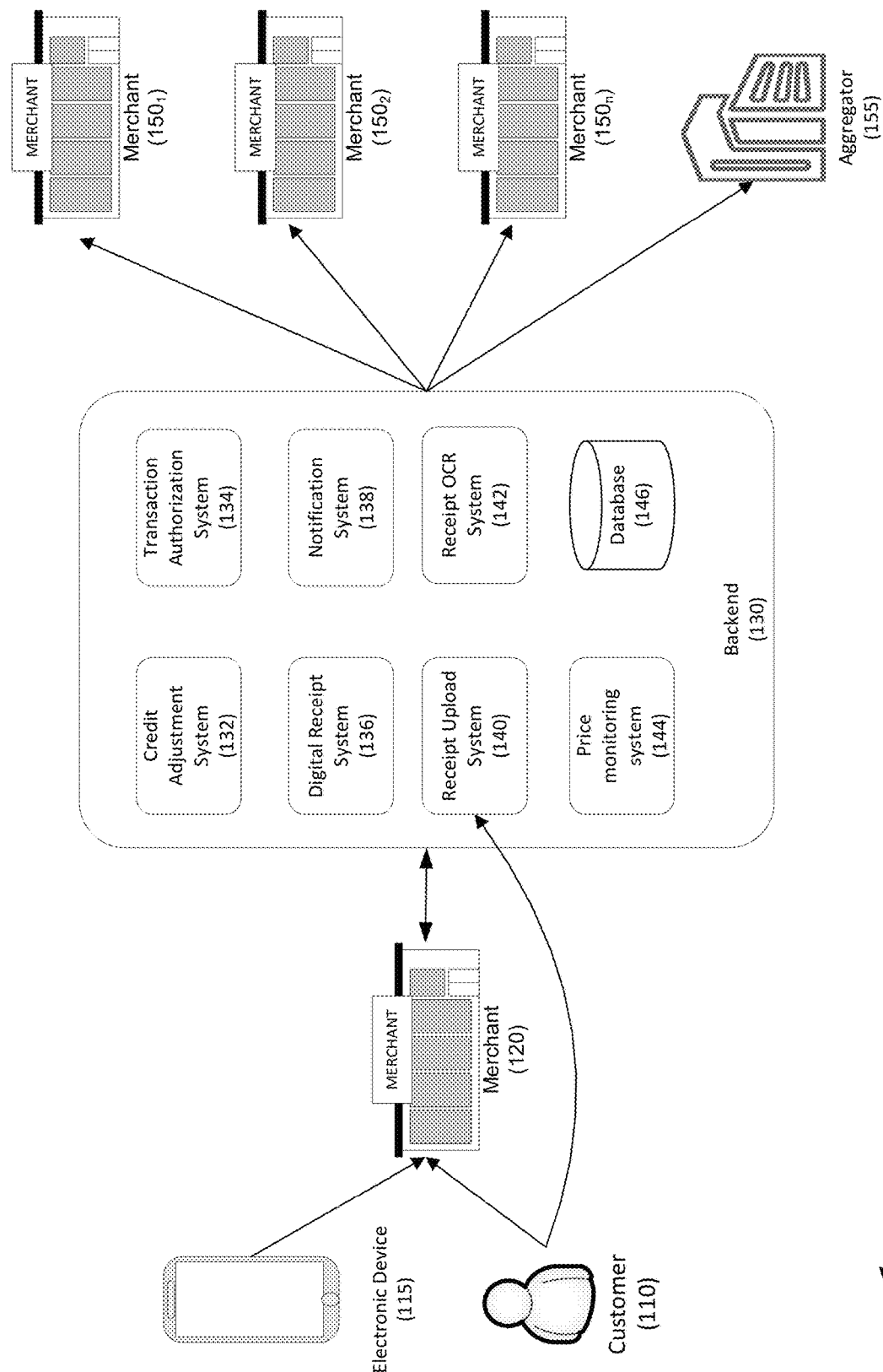
FIG. 1 depicts a system for digital refunds according to one embodiment.

Referring to FIG. 1, an exemplary system for digital claims and/or digital rebates is provided according to embodiments. Note that the names of the systems involved are exemplary only and are not limiting.

System 100 may include customer 110 that may conduct a transaction for a product (e.g., a good or a service) with merchant 120. The transaction may be conducted in person or online. Customer 110 may pay for the transaction using a financial instrument such as a credit card (not shown), an electronic wallet, machine-readable code (e.g., QR codes), or payment application (not shown) executed by electronic device 115, etc.

Electronic device 115 may be any suitable electronic device such as smartphones, computers (e.g., desktop, laptop, notebook, tablet, etc.), wearable devices (e.g., smart watches, rings, bracelets, necklaces, glasses, etc.), Internet of Things (IoT) appliances, etc. Any suitable electronic device 115 may be used as is necessary and/or desired.

Merchant 120 may be any suitable provider of a product (e.g., a good or service). Merchant 120 may include brick-and-mortar retailers, on-line retailers, etc.

Merchant 120 may communicate with backend 130. Backend 130 may be a backend for a financial institution, such as the financial institution that issued the financial instrument involved in the transaction. Certain portions of backend 130 may be provided by a partner of the financial institution, a third party, etc. For example, if backend 130 is provided by a third party, it would not include transaction authorization system 134, but may instead receive transaction information from the financial institution.

Backend 130 may include a plurality of systems or modules, including credit adjustment system 132, transaction authorization system 134, digital receipt system 136, notification system 138, receipt upload system 140, receipt OCR system 142, and price monitoring system 144. These systems or modules may be individual systems, may be part of a larger system, etc.

Credit adjustment system 132 may process a rebate for an eligible rebate.

Transaction authorization system 134 may authorize the transaction from merchant 120 using a financial instrument. Transaction authorization system 134 may provide transaction details (e.g., merchant, product identifier, price, date) to digital receipt system 136.

Digital receipt system 136 may receive a receipt from merchant 120 and/or customer 110 and may itemize the product(s) on the receipt. Digital receipt system 136 may match a product on a receipt to a product identified in a transaction received from transaction authorization system 134. Digital receipt system 136 may receive current price information and merchant return policies from price monitoring system 144 and may initiate a rebate when a product is eligible for a rebate.

Notification system 138 may notify merchant 120 and/or customer 110 that merchant 120's conditions for a rebate have been satisfied and that a rebate to customer 110 is being processed.

Receipt upload system 140 may receive a receipt upload from customer 110. For example, a customer may email or send a text message with an image of a receipt to receipt upload system 140, may upload an image to receipt upload system 140 from an application executed on electronic device 115, etc. In one embodiment, receipt OCR system 142 may read a receipt image from digital receipt system 136 (if necessary) or receipt upload system 140, and may extract raw transactional data, such as the item and the price paid. The raw data is used by digital receipt system 136 to electronically monitor pricing for the item.

Backend 130 may further include database 146, which may store digital receipt information (e.g., transaction date, receipt identifier, merchant name, transaction date, transaction payment details, item price, etc.), transaction lifecycle information (e.g., a transaction identifier, a merchant identifier, a customer identifier, an item actual price, a claim status, a fulfilment status, a product identifier, a receipt identifier, etc.), inventory details (e.g., a product identifier, SKU data, purchase date, return policy identifier, return date, etc.), merchant information (e.g., a merchant identifier, a merchant name, a merchant location address, a merchant online store URL, etc.), customer information (e.g., a customer identifier, a customer name, a claim date, a claim identifier, etc.), and pricing information (e.g., a product identifier, a product price, a merchant identifier, etc.), etc. Database 146 may store additional and/or different data as is necessary and/or desired.

Price monitoring system 144 may electronically monitor merchant 120, merchants 150, and aggregator(s) 155 for return policies, pricing for products, etc.

Database 146 may further store information about completed refunds to prevent duplicate refunds for the same transaction.

In one embodiment, database 146 may include a distributed ledger or any suitable immutable database, and any of credit adjustment system 132, transaction authorization system 134, digital receipt system 136, notification system 138, receipt upload system 140, digital receipt OCR system 142, and price monitoring system 144 may write to the distributed ledger.

Merchants $150_1$, $150_2$, ... 150 may include competitors to merchant 120. Backend 130 may retrieve pricing for the product in question from one or more of merchants $150_1$, $150_2$, ... $150_n$.

Aggregator 155 may be a third party that aggregate return policies and/or prices from merchant 120, merchants $150_1$, $150_2$, ... $150_n$, etc. Backend 130 may retrieve return policy information for merchant 120 and/or pricing for the product in question from inventory aggregator 155.

In one embodiment, aggregator 155 may be part of a distributed ledger network (not shown) where merchants (e.g., merchant 120, $150_1$, $150_2$, ... $150n$, etc.) may participate in the distributed ledger network and may submit product price information, return policy information, etc.

Figure 2:
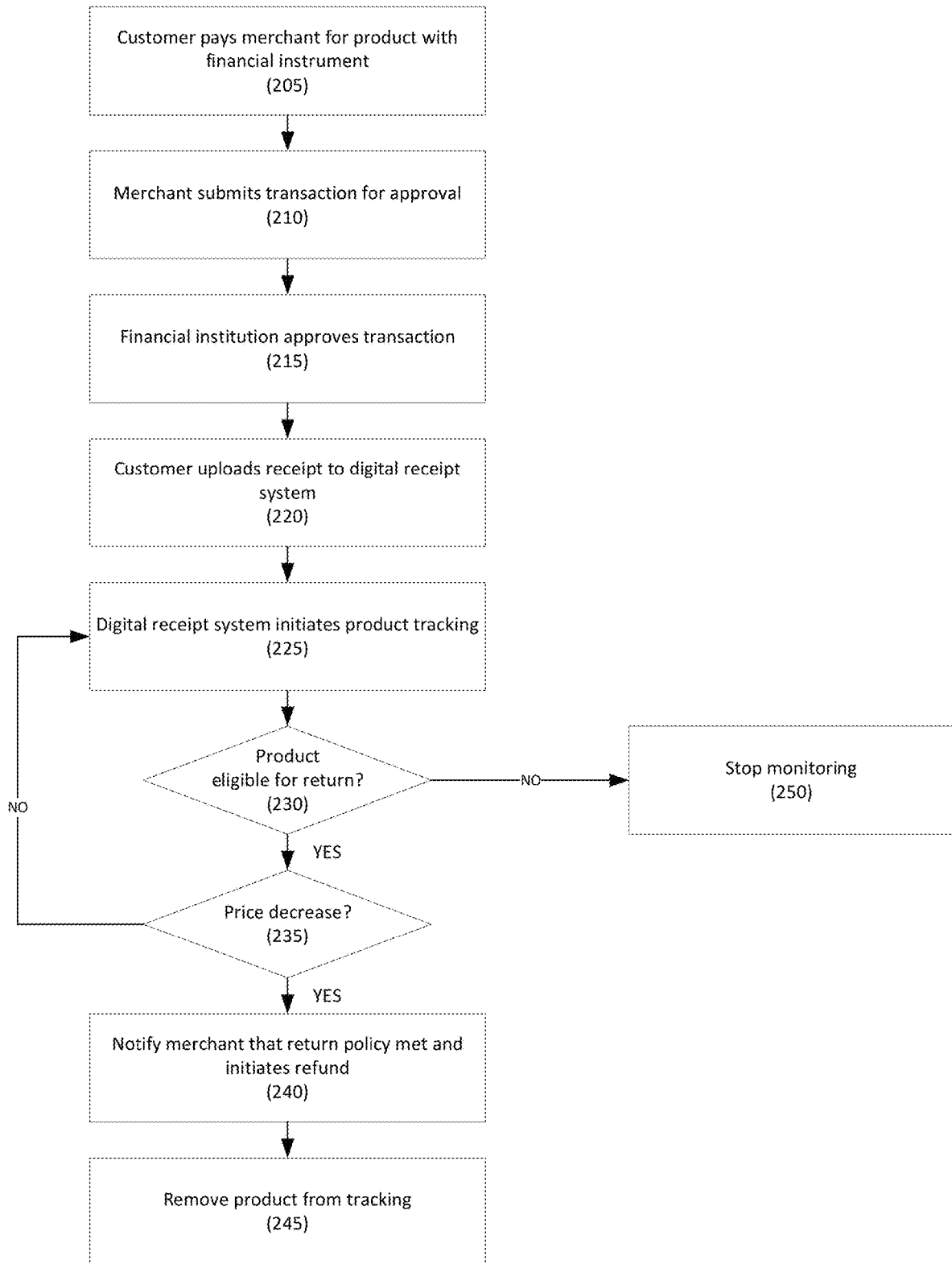
FIG. 2 depicts a method for digital refunds according to one embodiment.

Referring to FIG. 2, an exemplary method for digital claims and/or digital rebates is provided according to embodiments.

In step 205, a customer may shop for a product and may pay with a payment instrument issued by a financial institution. The product may have a purchase price. The customer may use a physical card, a digital wallet, a payment app, etc. to complete the transaction. The customer may receive a digital or a paper receipt for the transaction.

In step 210, the merchant may submit the transaction data to its merchant acquirer, then to the card network (e.g., VISA, MasterCard), and ultimately to the issuer. This is a business as usual process.

In step 215, the transaction may be authorized, which may be a business as usual process. A copy of the transactional data may be sent to a system, such as a credit refund system, for electronic tracking and monitoring. The credit refund system may persist the transaction metadata (e.g., the transaction ID, the transaction amount, the transaction date, the last four digits of the financial instrument, merchant ID, etc.).

In step 220, the customer may optionally image a copy of the transaction receipt and upload it to a system, such as a digital receipt system, via, for example, a mobile application associated with the financial instrument. Alternatively, if the merchant has a relationship with the financial institution, the merchant may send a digital receipt directly to the system.

In one embodiment, the customer may give permission to the financial institution to interact and/or communicate with the merchant on the customer's behalf. This may be part of accepting terms and conditions for using the service.

In step 225, the product(s) on the receipt (from the merchant, the customer, or both) may be itemized by, for example the digital receipt system, and may be stored. In one embodiment, it may the transactional metadata from step 215 with receipt metadata, and if the metadata matches, then the product may be added to the list of products to electronically monitor or track.

In one embodiment, the digital receipts system may store data from the receipt for analytics. It may also a copy of all the metadata (e.g., the transaction ID, the transaction amount, the transaction date, the last four digits of the financial instrument, merchant ID, etc.) to a tracking system, such as a credit refund system, to initiate the tracking process.

In step 230, a check may be made to see if the product is eligible for return. For example, certain products (e.g., computer software, perishable goods, etc.) may not be eligible for return under the merchant's policies. Other products may have a limited return period (e.g., 90 days, 30 days, etc.). In one embodiment, the length of the return period may vary based on the merchant, product type, etc.

In embodiments, certain information may be written to a distributed ledger, such a blockchain, and retrieved to make this determination. For example, item details such as the manufacturer model numbers, manufacturer SKU codes, item specifications, price, price validity dates, return policies, geographic locations, etc. may be written to the distributed ledger. Merchants, manufacturers, retail vendors, wholesale vendors, etc. may voluntarily submit product information to the distributed ledger, either directly or by using a third-party service. The third-party pricing service may, for example, make API service calls to retrieve the data from the merchants, manufacturers, etc. and may update the distributed ledger as necessary. The third-party pricing service may be provided as a free service or as a paid subscription based service that issuers and other interested parties can subscribe to get the latest price of items.

In embodiments, for each product to be electronically tracked or monitored, the tracking system may make a call to a third-party aggregator, such as a product inventory system, to obtain the return policy period and other merchant related information (e.g., return process policies, return process address, etc.) based on the merchant ID. In another embodiment, the tracking system may obtain the return policy period and other merchant related information from the merchant directly.

The tracking system may identify the product type and the merchant's return period for the product type and, based on the purchase date, current data, and other metadata as is necessary and/or desired, may determine if the product is eligible for return to the merchant.

If the product is not eligible for return, in step 250, the process may stop.

If the process is eligible for return, in step 235, the tracking system may determine if the current price for the product warrants a refund. For example, for each of the products to be electronically tracked or monitored, the tracking system may contact the third party or the merchant with the product SKU number and/or other metadata to retrieve current price(s) for the product. If the tracking system identifies a current price that is lower than the purchase price from the third-party aggregator, the merchant, or a third-party merchant, the tracking system may initiate the refund with the merchant.

In embodiments, if the customer finds a merchant that is offering the same product for a current price that is lower than the purchase price, the customer may take a screen shot, upload a picture of the advertisement, provide a link, etc. to show that the product price is lower than the purchase price, and may upload the image along with, for example, a form with all the details of the new price of the product, merchant name, merchant location etc. The uploaded proof may be sent to the tracking system for further verification and analysis. If accepted, the tracking system initiates the refund process with the merchant.

In embodiments, the current price may be determined using, for example, on-demand API calls, web crawlers, batch jobs, accessing a distributed ledger, webhooks from the merchants/manufacturers/third-parties, etc.

In one embodiment, the price difference between the purchase price and the current price may be required to meet or be greater than a threshold (e.g., a dollar amount difference, a percentage difference, etc.) before the price adjustment process is initiated with the merchant.

In one embodiment, machine learning may be used to determine the threshold. For example, prior refunds involving the customer may be used to identify the threshold (e.g., the customer only approved a refund when the difference between the current price and the purchase price exceeded a certain dollar amount, a certain percentage, etc.). In another embodiment, history with other customers may also be considered in identifying the threshold.

In one embodiment, steps 230 and 235 may be repeated as is necessary and/or desired. For example, embodiments may configure a scheduler to track the current price of the product by calling a product inventory system and/or the merchant at a frequent interval until the product is no longer eligible for return.

In step 240, the tracking system may notify the merchant of the transaction and with metadata regarding customer acceptance of terms of conditions on the return policy. The tracking system may then initiate the refund process by sending the details needed to adjust the difference in price.

In one embodiment, the tracking system may request the customer to authorize the refund before the refund process is initiated.

In step 245, the merchant may transfer the difference between the purchase price and the current price to the financial institution via, for example, a credit adjustment system. In embodiments, the credit adjustment system may inform the credit refund system of the successful money/credit adjustment. The refund amount may be automatically credited to the financial instrument used for the original purchase, may be credited as reward points, may be issued as a stored value instrument (e.g., a stored value card, a virtual financial instrument, etc.), may be sent as a paper check, etc. In other embodiments, the credit may be issued as a discount offer or any other suitable promotional means the issuer may deem feasible through various products the issuer has. The refund may be offered as a transaction adjustment on the monthly statement, or may be accumulated over a specific period of time and posted to customer's account (e.g., quarterly, every six months, annually, etc.) depending on the product and the terms and conditions.

In one embodiment, the credit adjustment system may keep track of the money transfer from the merchant to the bank for audit and historical reasons. For example, money transfers may be written to a distributed ledger.

In one embodiment the issuer may issue the refund the difference of amount to the customer after a certain period (e.g., a certain number of days) after the return period to make sure the customer did not return the product after refund adjustment.

In one embodiment, the completed refund may be written to a distributed ledger so that the customer cannot seek the refund twice. In another embodiment, the credit refund system may also track completed refunds to prevent the customer from being refunded twice, or to prevent the customer from later returning the item for the original purchase price.

In embodiments, the credit refund system may calculate any fees (e.g., 20% of the difference between the purchase price and the current price) and may credit the remaining amount to the customer's account (e.g., credit or debit account). In another embodiment, in addition to, or instead of, the customer fee, the credit refund system may charge a fee to the merchant.

The credit refund system may notify the customer of the adjusted amount/refund fulfillment.

In step 245, the tracking system may remove the product from the list of products or services to electronically monitor or track. This may be optional, and may depend on the merchant's policies. For example, a merchant may allow only one refunds; in another embodiment, the merchant may allow multiple refunds. After the number of refunds is met, the product may be removed.

Hereinafter, general aspects of implementation of the systems and methods of embodiments will be described.

Embodiments of the system or portions of the system may be in the form of a "processing machine," such as a general-purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized processor.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement embodiments may be a general-purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes disclosed herein.

The processing machine used to implement embodiments may utilize a suitable operating system. Thus, embodiments may include a processing machine running the iOS operating system, the OS X operating system, the Android operating system, the Microsoft Windows™ operating systems, the Unix operating system, the Linux operating system, the Xenix operating system, the IBM AIX™ operating system, the Hewlett-Packard UX™ operating system, the Novell Netware™ operating system, the Sun Microsystems Solaris™ operating system, the OS/2™ operating system, the BeOS™ operating system, the Macintosh operating system, the Apache operating system, an OpenStep™ operating system or another operating system or platform.

It is appreciated that in order to practice the method of the embodiments as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above, in accordance with a further embodiment, may be performed by a single component. Further, the processing performed by one distinct component as described above may be performed by two distinct components.

In a similar manner, the memory storage performed by two distinct memory portions as described above, in accordance with a further embodiment, may be performed by a single memory portion. Further, the memory storage performed by one distinct memory portion as described above may be performed by two memory portions.

Further, various technologies may be used to provide communication between the various processors and/or memories, as well as to allow the processors and/or the memories to communicate with any other entity; i.e., so as to obtain further instructions or to access and use remote memory stores, for example. Such technologies used to provide such communication might include a network, the Internet, Intranet, Extranet, LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of embodiments. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming. The software tells the processing machine what to do with the data being processed.

Further, it is appreciated that the instructions or set of instructions used in the implementation and operation of embodiments may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instruction or single programming language be utilized in conjunction with the operation of the system and method. Rather, any number of different programming languages may be utilized as is necessary and/or desired.

Also, the instructions and/or data used in the practice of embodiments may utilize any compression or encryption technique or algorithm, as may be desired. An encryption module might be used to encrypt data. Further, files or other data may be decrypted using a suitable decryption module, for example.

As described above, the embodiments may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in embodiments may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors.

Further, the memory or memories used in the processing machine that implements embodiments may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the systems and methods, a variety of "user interfaces" may be utilized to allow a user to interface with the processing machine or machines that are used to implement embodiments. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method, it is not necessary that a human user actually interact with a user interface used by the processing machine. Rather, it is also contemplated that the user interface might interact, i.e., convey and receive information, with another processing machine, rather than a human user. Accordingly, the other processing machine might be characterized as a user. Further, it is contemplated that a user interface utilized in the system and method may interact partially with another processing machine or processing machines, while also interacting partially with a human user.

It will be readily understood by those persons skilled in the art that embodiments are susceptible to broad utility and application. Many embodiments and adaptations of the present invention other than those herein described, as well as many variations, modifications and equivalent arrangements, will be apparent from or reasonably suggested by the foregoing description thereof, without departing from the substance or scope.

Accordingly, while embodiments present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A method, comprising:
   receiving, by a backend computer system and from a customer electronic device, a receipt for a transaction involving a product purchased by a customer from a merchant, wherein the backend computer system comprises at least one processor and a database, and the backend computer system participates in a distributed ledger network in which a merchant aggregator system for a merchant aggregator, a merchant system for the merchant, and a third party merchant system for a third party merchant are also participants;
   extracting, by the backend computer system, a product identifier and a purchase price from the receipt;
   determining, by the backend computer system, a return period in which the product is eligible for a return to the merchant by retrieving a merchant return policy for the merchant from the merchant aggregator system using an application programmable interface (API), wherein the merchant system submits its return policy to the merchant aggregator system;
   retrieving, by the backend computer system and during the return period, a current price for the product from the distributed ledger network, wherein the merchant system and the third party merchant system submit their current prices for the product to the distributed ledger network;
   determining, by the backend computer system and during the return period, that the current price for the product is less than the purchase price;
   initiating, by the backend computer system and during the return period, a refund to the customer from the merchant for a difference between the current price and the purchase price; and
   when the refund is complete, saving, by the backend computer system, the completed refund to the database.

2. The method of claim 1, wherein the refund is initiated when the difference between the current price and the purchase price meets or exceed a threshold amount.

3. The method of claim 2, wherein the threshold amount is based on a dollar amount between the current price and the purchase price or a percent difference between the current price and the purchase price.

4. The method of claim 1, wherein the refund is issued as a credit to a financial instrument used to conduct the transaction.

* * * * *